Oct. 22, 1963  J. J. FESCO  3,107,989
DISPOSABLE FILTER BAG
Filed Oct. 18, 1961  2 Sheets-Sheet 1
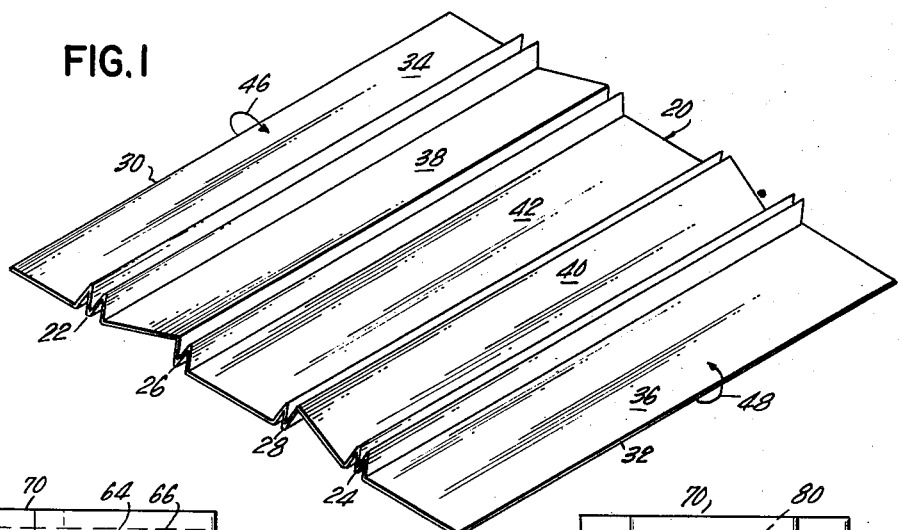
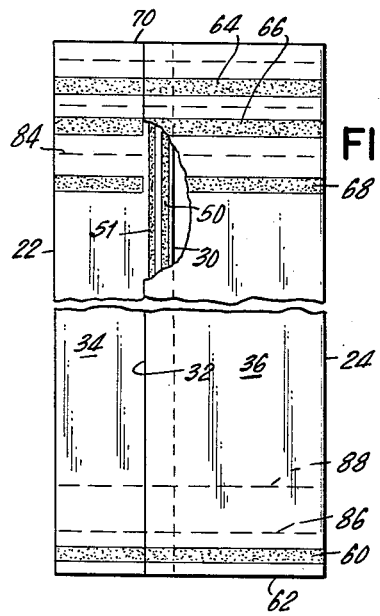
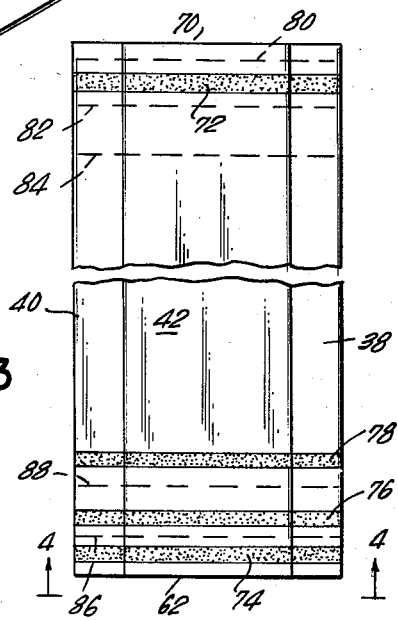
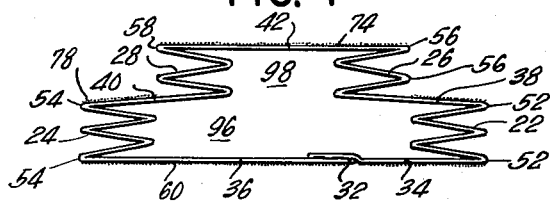
INVENTOR.
JOHN J. FESCO
BY
Friedman & Goodman
ATTORNEYS Oct. 22, 1963 J. J. FESCO 3,107,989
DISPOSABLE FILTER BAG
Filed Oct. 18, 1961 2 Sheets-Sheet 2
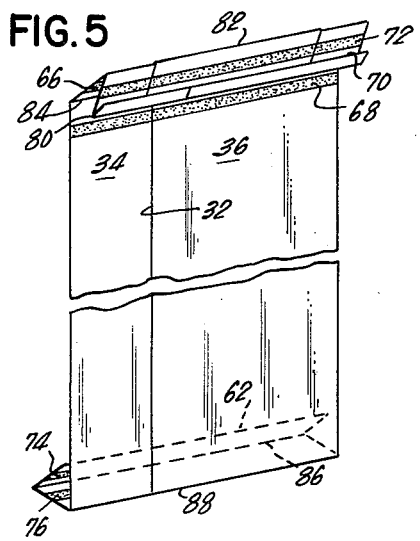
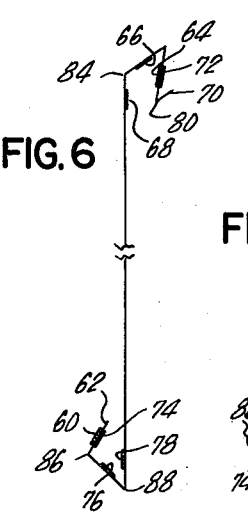
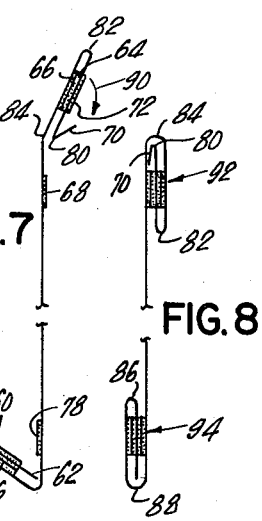
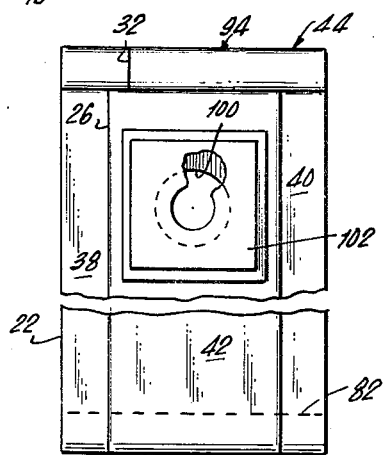
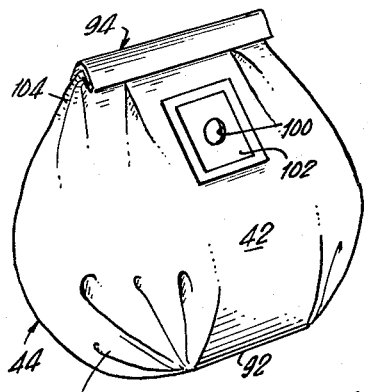
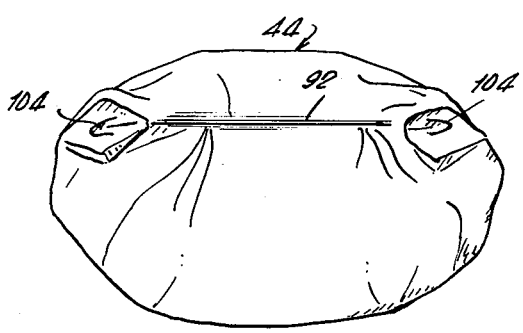
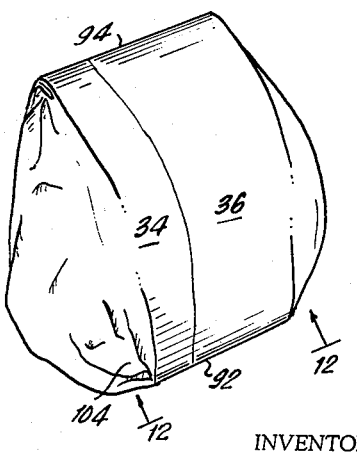
INVENTOR.
JOHN J. FESCO
BY
Friedman & Goodman
ATTORNEYS

United States Patent Office 3,107,989
Patented Oct. 22, 1963

3,107,989
DISPOSABLE FILTER BAG
John J. Fesco, Baldwin, N.Y., assignor to Studley Paper Company, Inc., a corporation of New York
Filed Oct. 18, 1961, Ser. No. 145,859
1 Claim. (Cl. 55—381)

The present invention relates in general to a bag and in particular to a pouch type bag eminently suitable for use as a disposable filter bag in a vacuum cleaner.

Modern vacuum cleaners utilize disposable filter bags in order to remove dust and debris from the air stream within the vacuum cleaner and to store the removed dust and debris until the filter bag and its contents may be removed from the vacuum cleaner for convenient disposal. This eliminates the unsanitary and otherwise highly undesirable characteristics of the formerly utilized permanent type of filter bag incorporated within the vacuum cleaner. The disposable filter bag must be made of relatively inexpensive materials and produced by relatively inexpensive manufacturing operations so that it may be sold at a relatively low price. As a result, disposable filter bags of the type intended for use with vacuum cleaners generally comprise an enclosure or bag formed of a flexible air pervious filter paper or similar material which is capable of performing the filtering or separating action in order to remove the dust, debris and other similar material from the air stream which is induced by the vacuum action of the vacuum cleaner. The filter bag must be capable of withstanding the stresses and forces created by the air stream flow therethrough as well as the weight of the waste material which remains within the bag as the air stream flows therethrough.

In order to be efficient, a filter bag of the described character must provide a maximum filter surface, it must in addition provide as large a volume as possible for receiving the waste material and, finally, it must be strong enough to withstand the pressures created by successive cleaning operations until the bag has been filled to capacity. Moreover, it is highly desirable that the bag have a universal shape or conformation which will permit it to be utilized with vacuum cleaners of different shapes and forms and in each case be capable of substantially completely filling the space provided within the vacuum cleaner for the filter bag.

In view of the foregoing, it is an object of the present invention to provide a bag of the pouch type which is particularly well adapted for use as a filter bag in a vacuum cleaner and which although highly efficient in operation can be manufactured of relatively inexpensive materials and by relatively inexpensive methods or processes so that it can be sold at a relatively low price.

In connection with the foregoing object, it is a further object of the present invention to provide a vacuum cleaner filter bag of a highly novel construction which provides a substantial filter surface area and forms an enclosure of substantial volume and highly increased strength.

It is further object of the present invention to provide a bag of the foregoing type which is compactly formed in order to occupy a relatively small storage and shipping space and which moreover may be distended to form a relatively large receptacle adapted to enclose a substantial volume.

It is another object of the present invention to provide a bag which is of a substantially universal type in that when distended it can conform itself to the shape and configuration of any housing or enclosure within which it may be contained so as to provide a minimum of wrinkled or irregular surfaces that may interfere with the air stream or separation function and which will make most efficient use of the space within which it is disposed.

Other and further objects, benefits and advantages of the present invention will become readily apparent to those skilled in the art from the description thereof contained in the following specifications taken in connection with the appended drawings.

In the drawings which illustrate the best mode presently contemplated for carrying out the invention:

FIGURE 1 is a perspective view of a blank from which the bag comprising the present invention may be formed;

FIGURE 2 is a plan view of the blank in an initial folded condition thereof during the formation of the completed blank;

FIGURE 3 is a view similar to FIGURE 2 and illustrates the surface opposite that shown in FIGURE 2;

FIGURE 4 is an end view of the blank illustrated in FIGURE 3 taken in the direction of the arrows 4—4 of FIGURE 3, the blank being shown in partially expanded condition for purposes of illustration;

FIGURE 5 is a perspective view similar to FIGURE 2 showing the ends of the folded blank in partially folded condition thereof during the manufacture of the bag;

FIGURE 6 is a more or less schematic illustration of the folding operation illustrated in FIGURE 5;

FIGURES 7 and 8 are views similar to FIGURE 6 illustrating additional folding operations encountered during the manufacturing operations to form the bag;

FIGURE 9 is a front plan view of the bag with a portion thereof being removed for purposes of illustration;

FIGURE 10 is a perspective view of the bag in expanded condition;

FIGURE 11 is a view similar to FIGURE 10 looking at the bag from the surface thereof opposite that illustrated in FIGURE 10; and FIGURE 12 is a bottom view of the bag taken in the direction of the arrows 12—12 in FIGURE 11.

Referring now to the drawings in detail, FIGURE 1 illustrates a blank 20 from which the expansible bag of the pouch type of the present invention may be advantageously formed. The blank 20 comprises an elongated sheet of material such as flexible porous paper, which is normally employed in forming vacuum cleaner disposable filter bags. The longitudinal blank 20 is formed with four sets of transversely extending re-entrant double folds of which the outer sets of double folds are indicated at 22 and 24 respectively and the inner sets of double folds are indicated at 26 and 28 respectively so as to define inwardly extending pleats. The opposing transverse marginal edges 30 and 32 respectively of the blank 20 define with the adjacent folds 22 and 24 respectively, transverse end panels 34 and 36, it being noted that in the present embodiment the panel 36 is wider than the panel 34. The adjacent folds 22 and 26 define a transverse panel 38 and the adjacent folds 24 and 28 define a transverse panel 40, it being noted that panels 40 and 38 are of substantially the same width. The innermost folds 26 and 28 define a transverse panel 42 which is wider than the adjacent panels 38 and 40.

The first step in the formation of the filter bag 44 is to fold the panels 34 and 36 inwardly as indicated by the arrows 46 and 48 so that the panel 36 will overlie the panel 34 as illustrated in FIGURE 2. Viewing said FIGURE 2, is will be noted that the transverse marginal edge of blank 20 overlies and extends to the left of the transverse marginal edge 30. In order to retain the blank 20 in the folded-over condition thereof, as illustrated in FIGURE 2, two stripes of a water-resistant adhesive are provided on panel 34 adjacent marginal edge 30, as indicated by the reference numerals 50 and 51. It will be understood that suitable pressure or other means are utilized to firmly adhesively secure panel 36 in overlying relation to panel 34, as illustrated in FIGURE 2. With the blank so folded, and as best shown in FIGURE 4, it will be noted that the front wall or panel of the blank is formed by the panel 42 and that the rear wall is formed by the superimposed panels 34 and 36. One longitudinal side of the blank is formed by the double pleats 26, the intermediate panel 38 and the triple pleats 22, and the other longitudinal side of the blank is formed by the double pleats 28, the intermediate panel 40 and the triple pleats 24. It will be noted that along each longitudinal side of the blank as folded, the apices 52 and 54 of the pleats 22 and 24 respectively outwardly beyond the adjacent apices 56 and 58 of the pleats 26 and 28 respectively. Consequently, it will be readily apparent as best shown in FIGURE 4, that the pleats 22 and 24 extend laterally outwardly of the adjacent pleats 26 and 28 respectively.

With the blank folded over upon itself as shown in FIGURE 2, a single adhesive stripe 60 is provided on the superposed panels 34 and 36 adjacent the lower marginal edge 62 of the folded blank and three spaced adhesive stripes 64, 66 and 68 are provided in the named order inwardly from the upper marginal edge 70 across the folded-over panels 34 and 36. Similarly, on the reverse surface of the folded blank, as best shown in FIGURE 3, a single strip or stripe of adhesive is provided across panels 40, 42 and 38 adjacent the upper marginal edge 70 and three spaced stripes of adhesive are provided inwardly of the marginal edge 62 across the panels 38, 40 and 42 as indicated at 74, 76 and 78 in the named order, the adhesive stripe adjacent the upper marginal edge 70 being indicated at 72. It will be understood that in each case a preferably water-resistant adhesive is used. As best noted in FIGURE 6, the adhesive stripes 64 and 72 are in superposed registry at the upper end of the folded blank and the adhesive stripes 60 and 74 are in superposed registry at the lower end of the folded blank. At the upper end of the folded blank provision is made for a fold line 80 between the upper marginal edge 70 and the superposed stripes 64 and 72, a second fold line 82 being provided between said superposed stripes and the adhesive stripe 66 and a third fold line 84 being provided between the adhesive stripes 66 and 68. Adjacent the lower end of the folded blank a fold line 86 is provided between adhesive stripe 76 and the superposed adhesive stripes 60 and 74 and a second fold line 88 is provided between the adjacent stripes 76 and 78.

The final assembly of the folded-over blank 20 to form the finished bag 44 is illustrated in FIGURES 5, 6, 7 and 8. Viewing said figures, the upper end of the folded-over blank is bent upwardly at the fold line 80 adjacent to the marginal transverse edge 70. The blank is then bent downwardly along the transverse fold line 82 so as to secure the adhesive stripes 64 and 66 together. The initially secured end is then folded downwardly or inwardly along the fold line 84, as indicated by the arrow 90 to secure the adhesive stripes 68 and 72 together, as indicated in FIGURE 8 with the fold line 80 tucked in in position inwardly of the fold line 84 as best shown in FIGURE 8, so as to form a triple seal constituted by the three fold lines 80, 82 and 84 and the adhesively engaged adhesive stripes 64 and 66 and 72 and 68, it being noted in FIGURE 8 that all four of said adhesive stripes are in superposed registry. The resultant triple seal 92 forms the bottom of the completed bag 44 as best shown in FIGURE 9. The lower end of the folded-over blank 20, viewing FIGURES 5, 6 and 7, is initially folded inwardly at the fold line 86 so as to secure the adhesive stripes 74 and 76 together, as best shown in FIGURE 7. Thereafter, the blank is folded inwardly along the fold line 88 so as to secure the adhesive stripe 60 to the adhesive stripe 70, as best illustrated in FIGURE 8, so as to form a double seal 94 which forms the top of the finishd bag 44, as best shown in FIGURE 9. The finished bag as illustrated in FIGURE 9 therefore has a fold double seal 94 which forms the top thereof, a folded triple seal 92 which forms the bottom thereof and a pair of longitudinal sides defined by the opposing pairs of pleats 22 and 24. It will be noted, as best illustrated in FIGURE 4, that the opposing pleats 22 and 24 and the underlying superposed panels 32 and 36 plus the overlying panels 38 and 40 define a first longitudinally extending expansible chamber 96 and that the front panel 42 and the inwardly disposed pleats 26 and 28 define a second longitudinally expansible chamber 98 which is in air-flow communication with the chamber 96. In order to provide for the entry of an air-flow stream into the bag, as when used in a vacuum cleaner, an aperture 100 is advantageously formed in the front face or panel 42, which aperture is surrounded by a collar or flange 102 to provide a suitable mounting means for the inlet fitting or conduit of a vacuum cleaner and to provide access into the interior of the bag.

FIGURES 10, 11 and 12 illustrate the bag or pouch 44 in expanded condition as when receiving an air flow within a vacuum cleaner chamber. It will be noted that the air first tends to fill or expand the expansible chamber 96 and as the air flow continues and suitable pressure is built up, the communicating chamber 98 is also expanded and filled. When the bag is completely filled, it assumes the condition shown in FIGURES 10, 11 and 12. Due to the provision of a narrow expansible chamber 98 and a wider expansible chamber 96 so that in effect the chambers are offset from each other, the expanded bag can more readily accommodate to different contours or sizes of chambers so as in effect to constitute a universal bag or pouch for use in vacuum cleaner chambers. When completely expanded, the various folds or pleats are completely filled out so that in effect the chambers 96 and 98 merge into one enlarged chamber, as shown in FIGURES 11 and 12, as well as in FIGURE 10, with the roots of the various folds merging into the upper lock 94 and the lower lock 92, as shown at 104. As the bag 44 fills up with air and expands as a result thereof, the seal 92 at the bottom of the bag tends to be drawn into the interior of the bag as best shown in FIGURE 12, so as to round out the bottom of the bag and accommodate its fit to the contours of the vacuum cleaner chamber. Similarly, the seal 94 at the top of the bag tends to flatten down as illustrated in FIGURES 10 and 11 to facilitate the accommodation of the bag to the vacuum cleaner chamber. The double and triple seals 94 and 92 respectively at the upper and lower ends of the bag are well able to withstand the pressures encountered in vacuum cleaner use so as to prevent tearing of the bag during normal use thereof.

While I have illustrated and described the presently preferred embodiment of my invention, it will be apparent that changes and modifications may be made therein without however departing from the spirit and scope of the invention as set forth in the appended claim.

I claim:

A bag comprising a blank of sheet material folded upon itself to form a tube in which one longitudinal edge thereof overlies another longitudinal edge thereof, means adhesively securing said longitudinal edges in said overlying relation, said folded blank having opposite transverse end portions, one of said end portions being provided on one outer surface thereof with three transverse stripes of adhesive material spaced longitudinally of said blank, one of said stripes being adjacent to the marginal edge of said one end portion and the second and third adhesive stripes being spaced inwardly of said one stripe toward the other transverse end portion of said blank, said one end portion being provided on the opposite outer surface thereof with a transverse stripe of adhesive material which is spaced from the adjacent marginal edge to the same extent that said one stripe is spaced from said adjacent marginal edge, a first fold line defined between said one and said second stripes and said blank being folded on said first fold line so that said one stripe is engaged with and is adhesively secured to said second stripe, a second fold line defined between the stripe in said opposite outer surface and the adjacent marginal edge, said blank being folded upon itself at said one end portion, a third fold line defined between said second and third adhesive stripes, and said blank being folded on said third fold line so that said stripe on said opposite outer surface is engaged with and is adhesively secured to said third adhesive stripe to lock said marginal edge between said third stripe and said stripe on said opposite outer surface.

References Cited in the file of this patent

UNITED STATES PATENTS

| | | |
|---|---|---|
| 2,577,863 | Sosnowich | Dec. 11, 1951 |
| 2,751,041 | Cropley | June 19, 1956 |
| 2,867,183 | Klasing | Jan. 6, 1959 |
| 2,961,063 | Fesco | Nov. 22, 1960 |

FOREIGN PATENTS

| | | |
|---|---|---|
| 567,484 | Great Britain | Feb. 15, 1945 |